United States Patent Office 2,773,859
Patented Dec. 11, 1956

2,773,859
ROSIN POLYMERIZATION PROCESS

Alfred L. Rummelsburg, Chadds Ford, Pa., assignor to Hercules Powder Company, Wilmington, Del., a corporation of Delaware No Drawing. Application December 29, 1951,
Serial No. 264,243

10 Claims. (Cl. 260—99.5)

This invention relates to a process for polymerizing rosin materials and more particularly to a process for polymerizing rosin materials in the presence of an aldehyde or aldehyde-yielding compound.

It is known that rosin is deficient for many purposes, particularly because of its softness and poor bodying characteristics. One of the means practiced by the art to overcome such deficiencies has been the polymerization of rosin, and by this means some improvement has been obtained in bodying, drying, and flexibility characteristics. However, the increase in softening point of rosin which may be attained by known polymerization processes is limited and cannot be feasibly extended even by utilizing more drastic rosin polymerization conditions, since side reactions then occur which produce undesirable results such as a darkening in color, an excessive reduction in acid number, and often an increase in rosin-oil formation. There has been a need in the art for a process which would improve the properties of rosin to a greater extent than is possible with the polymerization processes of the art.

Now in accordance with this invention it has been found that a rosin material such as a rosin, rosin ester or ester of rosin alcohol may be converted into a high melting product by polymerizing the rosin material in the presence of a rosin polymerization catalyst until a product having a drop softening point of at least 90° C. is produced, adding to the reaction mixture a modifying agent such as an aldehyde, or aldehyde-yielding compound, for example, an aldehyde polymer or a monoether, monoester or ether-ester of a gem-diol, or a gem-diether or gem-diester, and continuing the polymerization reaction. The maximum extent to which polymerization will be carried out prior to the addition of aldehyde or aldehyde-yielding compound will be determined by the particular properties of the product desired and the limitations of the polymerization process utilized. The reaction time following the addition of the modifying agent can vary from about five minutes to about four hours; usually about ½ hour is sufficient for most purposes.

The general procedure for preparing the condensates of this invention may be illustrated as applied to rosin. A solution of rosin in an inert solvent is contacted with a rosin polymerization catalyst, for example, 95% sulfuric acid, and thereafter polymerization of the rosin is permitted to proceed for a short period of time, say ½ hour. When the reaction product has a drop softening point of at least 90° C. an aldehyde or aldehyde-yielding compound, such as dimethyl formal, is then added dropwise, preferably in the same inert solvent used to dissolve the rosin, and the reaction is allowed to continue for an additional short period of time. It is important to the success of the process that the modifying agent be not added until initial polymerization has produced a product having a drop softening point of 90° C. or higher. The final reaction solution may be decanted from any sludge formed during the reaction, and the improved rosin product recovered by evaporating the solvent.

The following examples represent specific embodiments of the invention. Unless otherwise specified, all parts are parts by weight, and color grades refer to the rosin color scale.

EXAMPLES 1–20

Examples 1–20 were carried out in the following general manner. One hundred parts N wood rosin, dissolved in 233 parts benzene was placed in a reaction vessel and 25 parts of 95% sulfuric acid was added dropwise with agitation maintaining constant temperature. Agitation was continued at the same temperature (usually for ½ hour) until the reaction product had a drop softening point of at least 90° C. A 40% solution of aldehyde or aldehyde-yielding compound in benzene was then added dropwise, and agitation contniued for an additional ½ hour. The reaction solution was decanted from the sludge which was formed during the reaction and washed with warm water containing a small amount of sodium chloride. The product was recovered by evaporating the solvent using a final temperature of 220° C. and 20–25 mm. pressure. Additional product was recovered by dissolving the sludge in a mixture of alcohol and benzene, water-washing and evaporating the solvent. The products produced using various aldehydes and aldehyde-yielding compounds following this procedure are shown in Table I.

Table I

| Ex. | Aldehyde | Percent Aldehyde (Rosin Basis) | Rosin Polymerization Period (min.) | Aldehyde Reaction Period (min.) | Reaction Temp. (°C.) | Yield of Pale Product, Total Reactant Basis | Analysis of Pale Product | | |
|---|---|---|---|---|---|---|---|---|---|
| | | | | | | | A. N. | Drop Softening Pt.,°C. | Color |
| 1 | None | None | 45 | None | 12-15 | 79.3 | 163 | 96-105 | K+ |
| 2 | Trioxane | 5.9 | 30 | 30 | 12-15 | 74.2 | 159 | 122 | K |
| 3 | Acetaldehyde | 7.4 | 30 | 30 | 12-15 | 79.4 | 153 | 113 | K |
| 4 | do | 13.5 | 30 | 30 | 14-16 | 75.6 | 151 | 116 | I |
| 5 | do | 3.8 | 30 | 30 | 15-18 | 78.8 | 156 | 114 | K− |
| 6 | do | 5.0 | 5 | 55 | 15-18 | 79.7 | 160 | 110 | I |
| 7 | do | 4.2 | 30 | 30 | 15-18 | | 154 | 114 | I+ |
| 8 | Paraldehyde | 8.9 | 30 | 30 | 12-15 | 79.0 | 152 | 114 | K |
| 9 | do | 14.8 | None | 60 | 12-15 | 84.5 | 155 | 105 | K |
| 10 | do | 8.0 | 30 | 30 | 15-18 | 74.8 | 155 | 117 | I |
| 11 | do | 8.0 | 30 | 30 | 15-18 | 76.2 | | 116 | I |
| 12 | do | 5.0 | 30 | 30 | 15-18 | | 156 | 114 | K |
| 13 | Crotonaldehyde | 14.0 | 30 | 30 | 12-15 | 75.4 | 153 | 118 | H− |
| 14 | do | 6.7 | 30 | 30 | 12-15 | 76.3 | 157 | 115 | I+ |
| 15 | Methylal (dimethyl formal) | 9.4 | 30 | 30 | 12-15 | 84.0 | 154 | 126 | G+ |
| 16 | do | 5.0 | 30 | 30 | 14-15 | 83.4 | 151 | 121 | I |
| 17 | do | 18.0 | 30 | 30 | 14-16 | 81.0 | 149 | 128 | F+ |
| 18 | do | 5.0 | None | 30 | 14-15.5 | 83.2 | 166 | 96 | K |
| 19 | Methyl hemiformal | 5.0 | 30 | 30 | 14-16 | 81.0 | 155 | 120 | K− |
| 20 | do | 3.0 | 30 | 30 | 14-16 | 81.0 | 159 | 116 | K− |

EXAMPLE 21

The product of Example 10 was vacuum distilled at 1 mm. to remove 23% of the low end. The residue was found to have an acid number of 152, and a drop softening point of 138° C.

EXAMPLE 22

Forty parts of 95% sulfuric acid was added dropwise to an agitated solution of 159 parts N wood rosin in 315 parts ethylene dichloride over a period of 7 minutes, the mixture being maintained at a temperature of 13–17° C. After 5 minutes of agitation at this temperature, 4.8 parts of hemimethylformal dissolved in 25 parts ethylene dichloride was added dropwise over a period of 5 minutes, the temperature being maintained at 13–17° C. After further agitation for 10 minutes at this temperature, 230 parts of 33% aqueous sulfuric acid was added, and the mixture heated with agitation for 1 hour at the reflux temperature of 78° C. The ethylene dichloride solution was then decanted and water-washed and mixed with a small amount of xylene. Solvents ethylene dichloride and xylene were removed by distillation carried out at 220° C. at a pressure of 15–25 mm., leaving a condensate residue which had an acid number of 156, a drop softening point of 139° C. and a color G.

The above reaction was duplicated with the exception that no hemimethylformal was added. The product had a drop softening point of 125° C.

EXAMPLE 23

Two hundred twenty-six parts of 95% sulfuric acid was added dropwise to an agitated solution of 900 parts N wood rosin in 1782 parts benzene over a period of 24 minutes, while maintaining the temperature at 15° C. After agitating the mixture for 30 minutes at 15° C. a solution of 45.4 parts dimethyl formal in 170 parts benzene was added dropwise over a period of 25 minutes with continued agitation, maintaining the temperature constant. After further agitation for 30 minutes at 15° C. the reaction solution was decanted from a heavy liquid sludge and washed with warm water containing a small amount of sodium chloride. The solution was distilled at 210° C. and 20 mm. pressure to yield a residual condensate having an acid number of 156, a drop softening point of 125° C. and a color I.

Five hundred thirty-seven parts of the above product was vacuum distilled at 1 mm. pressure and 238° C. to remove about 127 parts of nonreacted monomeric constituents. The residue had an acid number of 157, a drop softening point of 153° C. and a color K+.

The catalysts of this invention may be described as any of the rosin polymerization catalysts known to the art, and are exemplified by sulfuric acid, hydrogen fluoride, phosphoric acid, aluminum trichloride, zinc chloride, etc. The quantity of catalyst utilized in any particular instance may be about the same as the quantities used in well-known rosin polymerization processes. Details of such rosin polymerization processes are available in a number of issued patents in the field such as, for example, U. S. 2,017,866 to A. A. Morton, and U. S. 2,108,928 to A. L. Rummelsburg.

The rosins and rosin compounds which may be modified according to this invention are characterized as containing two ethylenic double bonds in the rosin nucleus. The rosins may be those obtained by extraction from the stumps from the Jeffrey and Ponderosa pines as well as the rosins well known to the art, such as, for example, the rosins obtained from the Southern long-leaf pine tree. The rosins may be either the crude or refined types and may be of either the wood or gum variety. The refined types of rosin which may be treated in accordance with this invention are those which have been distilled under reduced pressure with the injection of an inert gas, extracted with color body solvents, treated with various adsorbents for the removal of various impurities, as color bodies visible and latent, oxidized resin acids, etc. The rosin may be subjected to a preliminary heat-treatment, or the heat-treatment step may follow the treatment in accordance with the reaction of this invention as may the other refining treatments given hereinabove. Desirably, the heat-treatment will follow the condensation reaction and will be carried out in an inert atmosphere, as, for example, carbon dioxide, nitrogen, etc.

In addition to wood and gum rosin, the rosin compounds which may be treated in accordance with this invention include the acids attainable from these rosins, such as, for example, abietic acid, neoabietic acid, levopimaric acid, dextropimaric acid, isodextropimaric acids, etc.; esters of these rosin acids with a monohydric or polyhydric alcohol such as methylabietate, ethylabietate, glycerol abietate, pentaerythritol abietate, etc.; and the esters of alcohols produced by the reduction of the carboxyl group of a rosin acid such as esters of abietyl alcohol, pimaryl alcohol, etc.

The modifying agents of this invention include saturated acyclic aldehydes with not more than 3 carbon atoms in the aldehyde chain; unsaturated acyclic aldehydes with not more than 4 carbon atoms in the aldehyde chain; aldehyde-yielding compounds such as aldehyde polymers, and monoethers, monoesters, and ether-esters of gem-diols, and also gem-diethers and gem-diesters wherein the ether and ester oxygen atoms are attached to acyclic carbon atoms, said aldehyde polymers, monoethers, monoesters, ether-esters, gem-diethers and gem-diesters being derived from saturated acyclic aldehydes with not more than 3 carbon atoms in the aldehyde chain, or derived from unsaturated acyclic aldehydes with not more than 4 carbon atoms in the aldehyde chain. The prefix "gem-" is derived from the word "geminate" meaning two groups attached to the same carbon atom. Thus, a gem-diol is a compound with two hydroxy groups attached to the same carbon atom. Correspondingly, a gem-diether is a compound with two ether groups attached to a single carbon atom and a gem-diester contains two ester groups attached to the same carbon atom. Ether-esters of gem-diols are compounds containing an ether group and an ester group attached to the same carbon atom as in compounds such as 1-methoxy-1-acetoethane, 1-ethoxy-1-acetoethane, etc.

As examples of saturated acyclic aldehydes of this invention there may be mentioned farmaldehyde, acetaldehyde, propionaldehyde, and compounds such as β-ethoxypropionaldehyde. Although compounds of the latter class contain a total of more than 3 carbon atoms, not more than 3 carbon atoms are present in the aldehyde chain and these compounds are therefore included among the modifying agents of this invention. Trioxane, p-formaldehyde, paraldehyde, glyoxal, and glutonic aldehyde are representative aldehyde polymers which are useful in this invention. Unsaturated aldehydes such as crotonaldehyde, acrolein, etc., may also be utilized, as may polymers of these aldehydes. It is advantageous to use acetals and gem-diesters of unsaturated aldehydes due to the relatively greater ease of handling and stability of such derivatives.

The modifying agents preferred in carrying out this invention comprise gem-diethers and gem-diesters wherein the oxygen atoms are attached to acyclic carbon atoms and which are derived from saturated acyclic aldehydes with not more than 3 carbon atoms in the aldehyde chain or from unsaturated acyclic aldehydes with not more than 4 carbon atoms in the aldehyde chain. Gem-diethers are generally known as acetals. In this invention dimethyl-, diethyl-, dipropyl-, dibutyl acetals, etc., are exemplary acetals, and the formals such dimethyl-, diethyl-, dipropyl-, dibutyl-, etc., formals as well as the corresponding propionals may also be utilized. The compounds 1,1,2,2-tetramethoxyethane and 1,1,3,3-tetramethoxypropane may be specifically mentioned as useful modifying agents in carrying out this invention. Acyclic acetals and acyclic gem-diesters containing aromatic or heterocyclic substituents may be utilized and may contain nonhydrocarbon substituents such as nitro and halogen groups, etc. In addition, hemiformals such as methyl hemiformal, hemiacetals such as methyl hemiacetal and hemiesters such as 1-hydroxyethyl acetate may be used, but these are less preferable due to handling difficulties and less desirable products. The diesters of gem-diols operable in this invention may be exemplified by compounds such as methylidene, and ethylidene diacetate. Diethers of gem-alkane diols, such as, for example, dimethyl formal, are particularly preferred in carrying out this invention as involving the least handling difficulties, while at the same time producing substantially greater improvement in the rosin product produced by this invention than other modifying agents.

It is a preferred procedure in carrying out the process of this invention, especially where the polymerization catalyst is sulfuric acid, to utilize an aldehyde derivative such as an acetal or gem-diester which yields an alcohol or an organic acid as a by-product whenever a sludge separation step is utilized. By using these classes of modifying agents, it is possible to obtain a product having a particularly light color. It appears, when the polymerization catalyst is sulfuric acid, that the by-product alcohol or acid enters the sludge layer where it acts as a diluent, thereby reducing the viscosity of the sludge and enabling efficient handling of the sludge in large scale operations. Aldehydes, on the other hand, tend to increase the viscosity of the sludge somewhat making handling operations more difficult.

The quantity of modifying agent required in carrying out the process of this invention will depend upon the molecular weight of the modifying agent, reaction temperature, quantity of catalyst and rosin or rosin compound concentration. The quantity of modifying agent is not critical, but will usually vary from 1–25% of the weight of the rosin, and preferably within the range of 2–15%.

The products of this invention when prepared from rosin materials other than rosin esters and esters of rosin alcohols may be further modified by reaction with compounds such as metal oxides to form resinates having high softening points and low solution viscosities. Such resinates are useful as stabilizers and driers in film-forming materials. On the other hand, these condensates may be esterified with alcohols such as glycerol, pentaerythritol, etc. to produce light-colored products having drop softening points and solution viscosities comparable with the condensate starting material. The ligth color in combination with the other properties of these esterified condensates renders them useful in protective coatings and related applications.

What I claim and desire to protect by Letters Patent is:

1. The process of polymerizing rosin materials of the group consisting of rosin, rosin esters, and esters of rosin alcohols which comprises polymerizing the rosin material in the presence of sulfuric acid catalyst at a temperature of about 12° to about 18° C. until the product has a drop softening point of at least 90° C., adding to the reaction mixture a modifying agent of the group consisting of saturated acyclic aldehydes containing not more than three carbon atoms in the aldehyde chain; unsaturated acyclic aldehydes containing not more than four carbon atoms in the aldehyde chain; aldehyde polymers; monoesters, monethers, and ether-esters of gem-diols; and gem-diethers and gem-diesters, wherein the oxygen atoms are attached to acyclic carbon atoms, said aldehyde polymers, monoethers, monoesters, ether-esters, gem-diethers and gem-diesters being derived from an aldehyde selected from the group consisting of said saturated acyclic aldehydes and said unsaturated acyclic aldehydes, and continuing the reaction.

2. The process of polymerizing rosin which comprises polymerizing the rosin material in the presence of sulfuric acid catalyst at a temperature of about 12° to about 18° C. until the product has a drop softening point of at least 90° C., adding to the reaction mixture a modifying agent of the group consisting of saturated acyclic aldehydes containing not more than three carbon atoms in the aldehyde chain; unsaturated acyclic aldehydes containing not more than four carbon atoms in the aldehyde chain; aldehyde polymers; monoesters, monoethers, and ether-esters of gem-diols; and gem-diethers and gem-diesters, wherein the oxygen atoms are attached to acyclic carbon atoms, said aldehyde polymers, monoethers, monoesters, ether-esters, gem-diethers and gem-diesters being derived from an aldehyde selected from the group consisting of said saturated acyclic aldehydes and said unsaturated acyclic aldehydes, and continuing the reaction.

3. The process of claim 2 wherein the modifying agent is a gem-diether in which the oxygen atoms are attached to acyclic carbon atoms and which is derived from an aldehyde containing not more than three carbon atoms in the aldehyde chain.

4. The process of claim 2 wherein the modifying agent is a gem-diester in which the oxygen atoms are attached to acyclic carbon atoms and which is derived from an aldehyde containing not more than three carbon atoms in the aldehyde chain.

5. The process of claim 2 wherein the modifying agent is an aldehyde polymer formed from an aldehyde containing not more than three carbon atoms in the aldehyde chain.

6. The process of claim 2 wherein the modifying agent is trioxane.

7. The process of claim 2 wherein the modifying agent is acetaldehyde.

8. The process of claim 2 wherein the modifying agent is dimethyl formal.

9. The process of claim 2 wherein the modifying agent is paraldehyde.

10. The process of claim 2 wherein the modifying agent is ethylidene diacetate.

References Cited in the file of this patent
UNITED STATES PATENTS

| | | |
|---|---|---|
| 2,084,213 | Osterof | June 15, 1937 |
| 2,346,993 | Palmer et al. | Apr. 18, 1944 |
| 2,572,071 | St. Clair et al. | Oct. 23, 1951 |